(12) United States Patent
Denoual et al.

(10) Patent No.: US 12,200,318 B2
(45) Date of Patent: Jan. 14, 2025

(54) METHOD AND APPARATUS FOR ENCAPSULATING ANNOTATED REGION IN ISOBMFF TRACKS

(71) Applicant: CANON KABUSHIKI KAISHA, Tokyo (JP)

(72) Inventors: Franck Denoual, Saint Domineuc (FR); Frédéric Maze, Langan (FR); Hervé Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 18/012,587

(22) PCT Filed: Jun. 3, 2021

(86) PCT No.: PCT/EP2021/064934
§ 371 (c)(1),
(2) Date: Dec. 22, 2022

(87) PCT Pub. No.: WO2021/259611
PCT Pub. Date: Dec. 30, 2021

(65) Prior Publication Data
US 2023/0254549 A1    Aug. 10, 2023

(30) Foreign Application Priority Data

Jun. 24, 2020 (GB) ................................ 2009673

(51) Int. Cl.
*H04N 21/81* (2011.01)
*G06T 7/50* (2017.01)
(Continued)

(52) U.S. Cl.
CPC .......... *H04N 21/8153* (2013.01); *G06T 7/50* (2017.01); *G06T 7/60* (2013.01); *G06V 10/25* (2022.01);
(Continued)

(58) Field of Classification Search
CPC .. H04N 21/8153; H04N 21/84; H04N 21/235; H04N 21/845; H04N 21/85406;
(Continued)

(56) References Cited

U.S. PATENT DOCUMENTS 11,863,767 B2 * 1/2024 Bouazizi ............ H04N 21/4316
2017/0346873 A1   11/2017 Denoual et al.
(Continued)

FOREIGN PATENT DOCUMENTS

| CN | 107750462 A | 3/2018 |
| CN | 109218755 A | 1/2019 |
| CN | 110383846 A | 10/2019 |
| CN | 110651482 A | 1/2020 |
| CN | 111213384 A | 5/2020 |
| GB | 2550912 A | 12/2017 |

OTHER PUBLICATIONS

David Singer (editor), Draft 14496-12 FDIS incorporating FDAM4 etc, Information Technology—JPEG 2000 image coding system—Part 12: ISO Base Media File Format, XP30289608.
(Continued)

*Primary Examiner* — Christopher K Peterson
(74) *Attorney, Agent, or Firm* — Canon U.S.A., Inc. IP Division

(57) ABSTRACT

A method of generating a media file, the method comprising: generating a first track of media data samples; generating at least one annotated region, the annotated region being associated with a geometry of the annotated region, the annotated region being associated with at least one region annotation describing the annotated region; wherein the annotated region is associated with the first track of media data samples; and generating a media file including the first track and the at least one annotated region, associated geometry and associated region annotation.

13 Claims, 10 Drawing Sheets

(51) Int. Cl.
  *G06T 7/60* (2017.01)
  *G06V 10/25* (2022.01)
  *H04N 21/84* (2011.01)
(52) U.S. Cl.
  CPC ......... *H04N 21/84* (2013.01); *G06V 2201/07* (2022.01)
(58) Field of Classification Search
  CPC ............. H04N 21/854; H04N 21/2353; H04N 21/8456; G06T 7/50; G06T 7/60; G06V 10/25; G06V 2201/07; G06F 16/783; G11B 27/322
  See application file for complete search history.

(56) References Cited

U.S. PATENT DOCUMENTS

| | | | |
|---|---|---|---|
| 2019/0208234 A1 | 7/2019 | Van Brandenburg | |
| 2020/0092530 A1 | 3/2020 | Wang | |
| 2021/0201855 A1* | 7/2021 | Kammachi-Sreedhar | ................... H04N 13/183 |
| 2022/0150296 A1* | 5/2022 | Hannuksela | ....... H04N 21/8456 |
| 2022/0159352 A1* | 5/2022 | Maze | ................ H04N 21/85406 |
| 2022/0245190 A1* | 8/2022 | Maze | ................ H04N 21/4223 |

OTHER PUBLICATIONS

Information technology—Coding of audio-visual objects—Part 12: ISO base media file format, ISO/IEC 14496-12, Dec. 15, 2015, Fifth edition, XP82009954.
Information technology—JPEG 2000 image coding system—Part 12: ISO base media file format, ISO/IEC 1544412 Oct. 1, 2005, Second edition, XP2501713.
Hervé Ruellan, et al., [HEIF] Region Annotations, International Organisation for Standardisation Coding of Moving Pictures, ISO/IEC/SC29/WG3 MPEG2021/m56024, Jan. 13, 2021, Doc. No. m56024, XP30290942.
Hervé Ruellan, et al., (22.3) [HEIF] Region Annotations, International Organisation for Standardisation, Coding of Moving Pictures, ISO/IEC/SC29/WG3 MPEG2021/m54441, Jun. 24, 2020, XP30288824.
Hervé Ruellan, et al., [HEIF] Region Annotations, International Organisation for Standardisation, Coding of Moving Pictures, ISO/IEC/SC29/WG3 MPEG2021/m56024, Jan. 6, 2021, Doc. No. m56024, XP30290941.
Hervé Ruellan, et al., [HEIF] Region Annotations, International Organisation for Standardisation, Coding of Moving Pictures, ISO/IEC/SC29/WG3 MPEG2021/m55055, Oct. 7, 2020, XP30292570.
Information technology—High efficiency coding and media delivery in heterogeneous environments—Part 12: Image File Format—Amendment 2: Support for VVC, EVC slideshows and other improvements, ISO/IEC 23008-12:2017 DAM 2:2021, ISO/IEC JTC1/SC29, XP30293701.
Sergey I. Nikolenko, et al., Synthetic Data for Deep Learning, ARVIX.org, Cornell University, Sep. 26, 2019, XP81483153A.
Ye-Kui Wang, et al., WD2 of ISO/IEC 14496-15 2013/MAD1 Enhanced support of HEVC and MVC+D, International Organisation for Standardisation ISO/IEC JTC1/SC29/WG11 Coding of Moving Pictures and Audio, Jan. 2014, Doc. No. w14123.
Miska M. Hannuksela et al., Overview of the High Efficiency Image File Format, Joint Collaborative Team on Video Coding (JCT-VC) of ITU-T SG WP 3 and ISO/IEC JTC 1/SC 29/WG 11, JCTVC-V0072, 22nd meeting, Oct. 15-21, 2015, Geneva, CH.

* cited by examiner

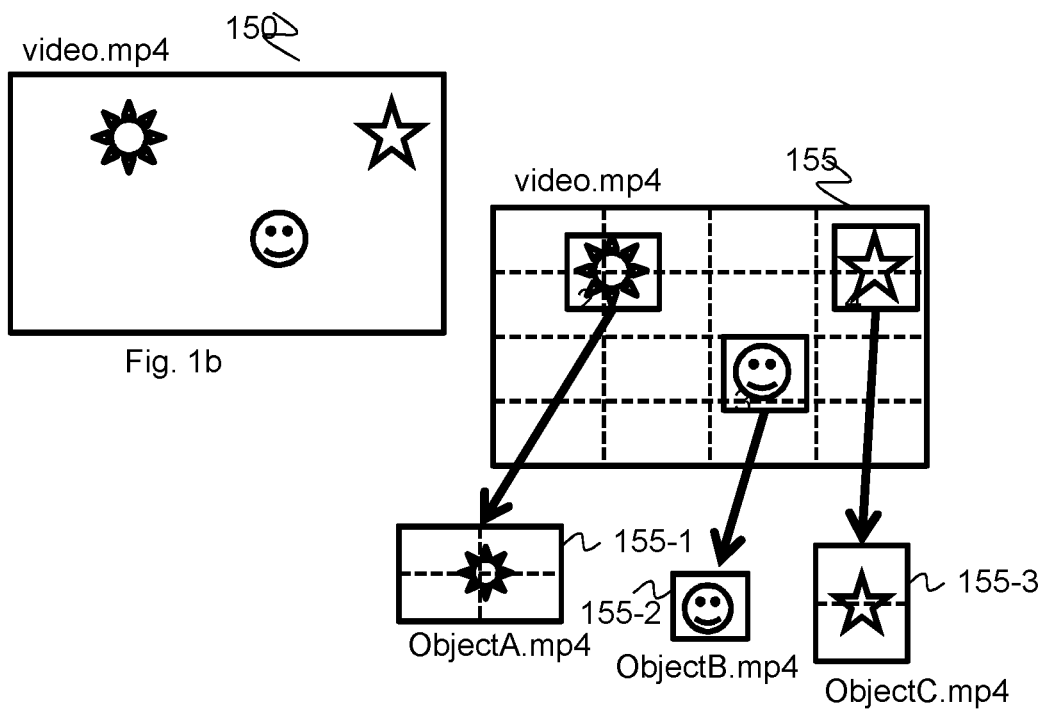
Fig. 1b
Fig. 1c
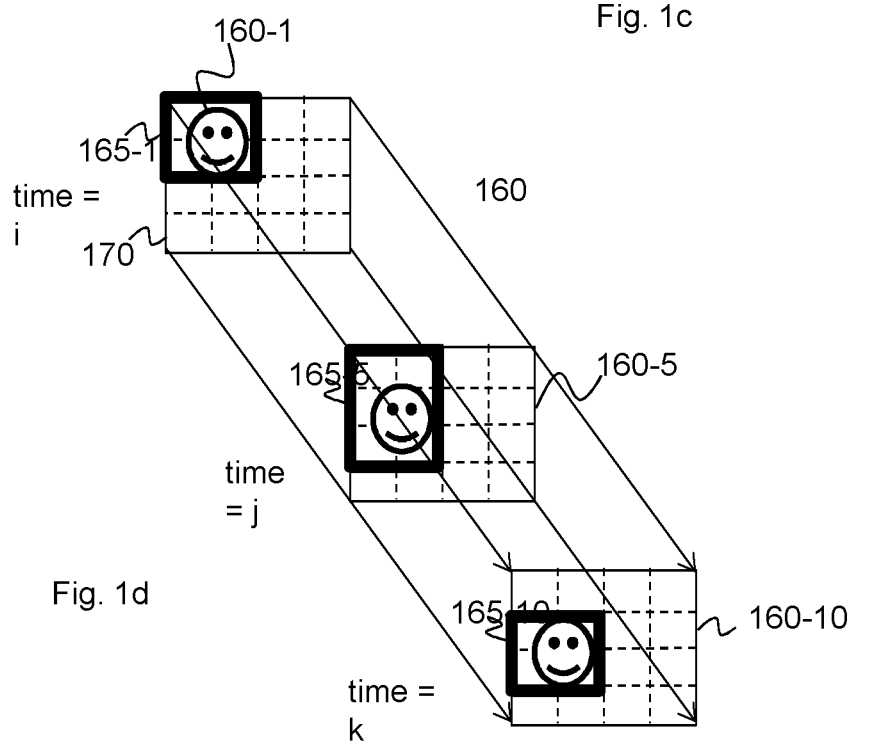
Fig. 1d

METHOD AND APPARATUS FOR ENCAPSULATING ANNOTATED REGION IN ISOBMFF TRACKS

CROSS REFERENCE TO RELATED APPLICATION

This application is the National Phase application of PCT Application No. PCT/EP2021/064934, filed on Jun. 3, 2021. This application claims the benefit under 35 U.S.C. § 119 (a)-(d) of United Kingdom Patent Application No. 2009673.1, filed on Jun. 24, 2020 and entitled 'METHOD AND APPARATUS FOR ENCAPSULATING ANNOTATED REGION IN ISOBMFF TRACKS". The above cited patent applications are incorporated herein by reference in their entirety.

FIELD OF THE INVENTION

The present disclosure concerns a method and a device for encapsulating annotated region in media tracks.

BACKGROUND OF INVENTION

Modern cameras and image analysis services enable to generate metadata for images or image sequences (e.g. annotated regions) associated with a portion of, a subpart of, or even an object within the images or image sequences. For example, a camera may generate the focusing region for a video or detect faces while recording a video. As another example, a deep-learning system may detect objects inside a sequence of moving images.

Images or videos captured by a camera or processed by an image analysis service are stored on a storage device like a memory card for example. The recorded videos are typically compressed to reduce the size of data on the storage device. Many video compression standards may be used, like the ones defined by the MPEG committee: AVC, HEVC or VVC.

Once compressed, the videos may be stored or transmitted through communication network for consumption by media players. For example, compression video sequence may be encapsulated into using the ISO Base Media File Format (ISOBMFF) to produce an ISO Base Media file or a set of ISOBMFF segments. Some video sequences, for example burst of images may also be stored as image sequence or image track using Image File Format like, for example HEIF or MIAF.

The International Standard Organization Base Media File Format (ISO BMFF, ISO/IEC 14496-12) is a well-known flexible and extensible file format that encapsulates and describes encoded timed or non-timed media data either for local storage or for transmission via a network or via another bitstream delivery mechanism. An example of extensions is ISO/IEC 14496-15 that describes encapsulation tools for various NAL (Network Abstraction Layer) unit-based video encoding formats. Examples of such encoding formats are AVC (Advanced Video Coding), SVC (Scalable Video Coding), HEVC (High Efficiency Video Coding), L-HEVC (Layered HEVC) and VVC (Versatile Video Coding). Another example of file format extension is ISO/IEC 23008-12 that describes encapsulation tools for still images or sequence of still images such as HEVC Still Image. Another example of file format extension is ISO/IEC 23090-2 that defines the omnidirectional media application format (OMAF). The ISO Base Media file format is object-oriented. It is composed of building blocks called boxes corresponding to data structures characterized by a unique type identifier, typically a four-characters code, also noted FourCC or 4 CC. Full boxes are data structures similar to boxes comprising in addition a version and flags value attributes. In the following, the term box may designate both full boxes or boxes. Those boxes or full boxes are hierarchically or sequentially organized in the ISOBMFF file and define parameters describing the encoded timed or non-timed media data, its structure and timing, if any. All data in an encapsulated media file (media data and metadata describing the media data) is contained in boxes. There is no other data within the file. File-level boxes are boxes that are not contained in other boxes.

In the file format, the overall media presentation is called a movie. The movie is described by a movie box (with the four-character code 'moov') at the top level of the file. This movie box represents an initialization information container containing a set of various boxes describing the media presentation. It is logically divided into tracks represented by track boxes (with the four-character code 'trak'). Each track (uniquely identified by a track identifier (track_ID)) represents a timed sequence of media data belonging to the presentation (frames of video or audio samples, for example). Within each track, each timed unit of data is called a sample; this might be a frame of video, audio or timed metadata. Samples are implicitly numbered in decoding order sequence. Each track box contains a hierarchy of boxes describing the samples of a track, e.g. a sample table box ('stbl') contains all the time and data indexing of the media samples in a track. The actual sample data are stored in boxes called Media Data Boxes (with the four-character code 'mdat') or Identified Media Data Boxes (with the four-character code 'imda', similar to the Media Data Box but containing an additional identifier) at the same level as the movie box. The movie may also be fragmented and organized temporally as a movie box containing information for the whole presentation followed by a list of media fragments, i.e., a list of couple movie fragment and Media Data boxes ('mdat' or 'imda'). Within a movie fragment (box with the four-character code 'moof') there is a set of track fragments (box with the four-character code 'traf') describing the tracks within the media fragment, zero or more per movie fragment. The track fragments in turn contain zero or more track run boxes ('trun'), each of which document a contiguous run of samples for that track fragment.

An ISOBMFF file may contain multiple encoded timed media data or sub-parts of encoded timed media data forming multiple tracks. When sub-parts correspond to one or successive spatial parts of a video source, taken over the time (e.g. at least one rectangular region, sometimes called 'tile' or 'sub-picture', taken over the time), the corresponding multiple tracks may be called tile tracks or sub-picture tracks.

ISOBMFF and its extensions comprise several grouping mechanisms to group together tracks, static items, or samples and associate a group description with them. A group typically shares common semantic and/or characteristics.

These encapsulation standards do not provide easy means to associate description or annotations with regions within an image or within a sequence of images in an interoperable way. "Easy means" should be interpreted here as processable by a generic ISOBMFF reader or ISOBMFF-based standard reader. For example, ISOBMFF does not provide a simple box or data structure for user annotation or textual description. There exist boxes for user data, but it is a container box for vendor-specific metadata, thus not dedicated to interoperability.

The Web Video Text Tracks Format (WebVTT), a Candidate Recommendation from W3C, provides captions or subtitles for video content, and also text video descriptions, chapters for content navigation, and more generally any form of metadata that is time-aligned with audio or video content. The association between a video file or a media file with a WebVTT file can be signaled in HTML but there is no specific relationship within an ISOBMFF file between WebVTT tracks and media tracks.

SUMMARY OF THE INVENTION

The present invention has been devised to address one or more of the foregoing concerns. It concerns more particularly solutions for describing annotated regions, possibly moving regions, in a video track. According to embodiments, the description of annotated regions may be stored in its own track and associated with the media track it describes. Description of annotated regions may be stored in its own track and associated with a metadata track describing a media track. Description of annotated regions may be stored within a specific part of a media file, for example a 'meta' box or in sample description. Description of annotated regions may be associated with a track, a group of samples or to groups of subsamples.

According to a first aspect of the invention there is provided a method of generating a media file, the method comprising:
generating a first track of media data samples;
generating at least one annotated region, the annotated region being associated with a geometry of the annotated region, the annotated region being associated with at least one region annotation describing the annotated region; wherein the annotated region is associated with the first track of media data samples; and
generating a media file including the first track and the at least one annotated region, associated geometry and associated region annotation.

In an embodiment:
the annotated region is defined as an item associated with the first track using an item reference box;
the region annotations are defined as item properties associated with the item defining the annotated region.

In an embodiment:
the annotated region is defined as an item associated with the first track using an item reference box;
the region annotations are defined as item properties directly or indirectly associated with the first track.

In an embodiment, the method further comprises:
generating a second track of timed metadata comprising the annotated regions stored as samples, the second track being associated with the first track using a track reference.

In an embodiment:
region annotations are stored as properties of a group of samples of the second track.

In an embodiment, the method further comprises:
generating a third track of samples, each sample being a region annotation associated with an annotated region of the second track, the third track being associated with the second track using a track reference.

In an embodiment:
region annotations are stored as properties of a property container in a meta data part of the media file.

In an embodiment:
annotated regions are associated with region annotations through group of samples in the second track.

In an embodiment:
the association between region annotations and annotated regions are stored in a sample group description entry indicating the index of the region annotation in the property container, the sample group description entry being associated with a group of samples in the second track.

In an embodiment, the first track comprises the annotated regions stored in samples group description entries, and comprises the region annotations stored as properties of the samples storing the annotated regions.

In an embodiment, the method further comprises:
generating a first grouping of samples indicating an annotated region; and
generating a second grouping of samples directly or indirectly indicating the region annotations.

In an embodiment, the second grouping of samples associates samples or group of samples to region annotations stored as properties in a property container box in the metadata part of the media file.

In an embodiment, the second grouping of samples is a default sample group associating all samples to region annotations stored as properties in a property container box in the metadata part of the media file.

In an embodiment, region annotations comprise textual annotations.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

According to another aspect of the invention there is provided a computer program which upon execution causes the method of the invention to be performed.

According to another aspect of the invention there is provided a device for generating a media file, the device comprising a processor configured for:
generating a first track of media data samples;
generating at least one annotated region, the annotated region being associated with a geometry of the annotated region, the annotated region being associated with at least one region annotation describing the annotated region; wherein the annotated region is associated with the first track of media data samples; and
generating a media file including the first track and the at least one annotated region, associated geometry and associated region annotation.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIGS. 1a-1d illustrate modules of an exemplary device implementing this invention;

DETAILED DESCRIPTION OF THE INVENTION

Figure 1A:
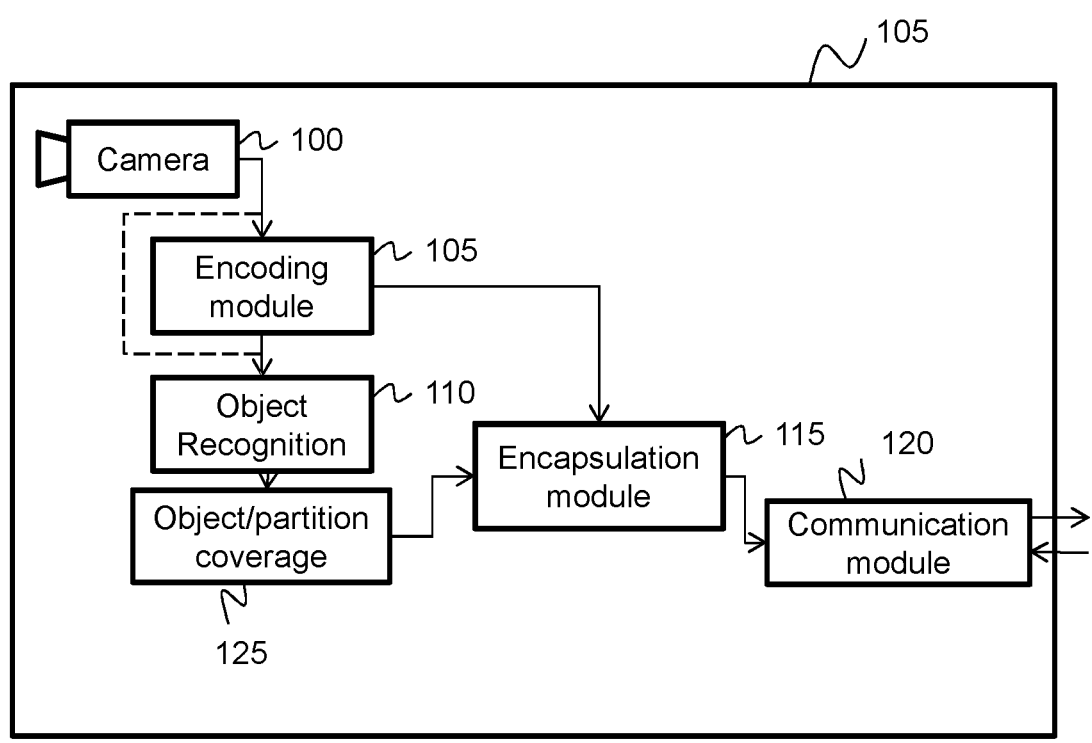

FIG. 1a illustrates modules of an exemplary device implementing this invention. It is to be noted that the invention may be implemented in any kind of computing device able to manipulate video files and is not limited to the device herein described. This device may be a recording device like a camera. It may have communication capabilities, for example a network camera with wired or wifi connection. It may be used as a media server using this communication module. For example, the device 105 is configured for encapsulating a video stream with annotated regions according to the invention. As illustrated, device 105 records a video source through a camera 100, producing sequences of images that can be compressed by an encoding module 105. An object recognition module 110 may be used to identify and locate one or several objects that can be tracked through a sequence of images to define regions of interest. These objects can be determined by image analysis after encoding or prior to encoding (as suggested with dotted line). The detected objects may move in the images over time and thus, potentially overlap at some point in time, appear or disappear. It is to be noted that the object recognition or detection step can be carried out offline, before the transmission of the video through a communication network, or online during encoding of the images issued by the video source and transmission of the encoded images. The detection may be handled by an external device, the device 105 then communicating with this external device in charge of content analysis for object recognition through the communication module. The recognized or detected objects onto the recorded images may be associated with a whole image or to partitions within an image (e.g. NAL units, slices, tiles, subpictures . . . ). As illustrated, the encoded images are encapsulated into a media file or into media segments in encapsulation module 115 before being possibly transmitted using a communication module 120. The transmission may occur when a client requests the device server 105 to download the media file, or requests the device server for adaptive streaming of the file.

FIG. 1b is an example of objects detected onto an image 150. Each object may be described with a textual annotation, for example: a flower, a star, a person . . . .

FIG. 1c is an example of detected objects onto an image 155 with corresponding picture partitioning (for example slices, tiles or subpicture represented by the dashed lines). For some detected objects, a corresponding image or sequence of images may be available as a media track (155-1, 155-2 or 155-3). Images in this media track are composed of one or several portions of the complete image sequence.

FIG. 1d is an example of a moving region of interest (165-1, 165-5 and 165-10) into a sequence of images 160 (for example: a recognized face). On this example FIG. 1d, the picture partitioning 170 is also depicted. The moving region is composed of the image portions overlapping with the object. The image portion composing the moving region of interest and their number may vary over time to follow the object in the image.

Figure 2:
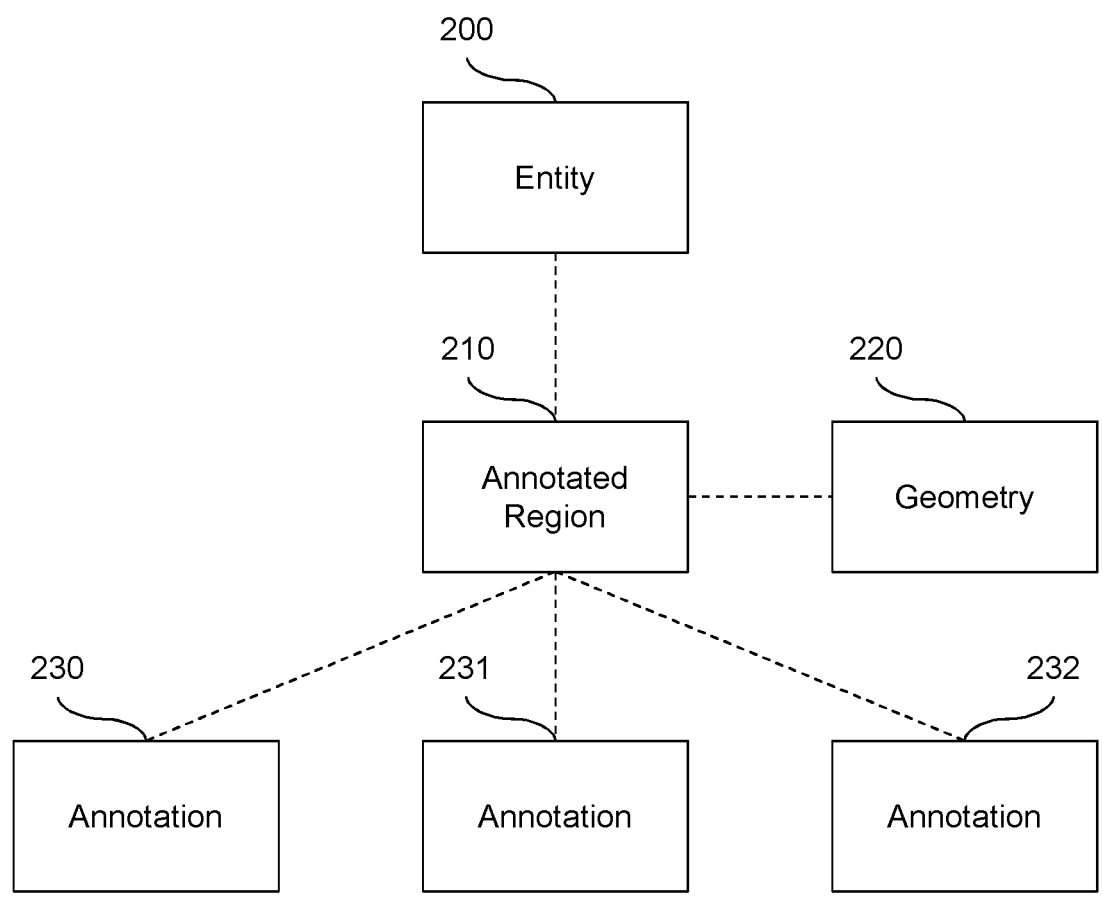
FIG. 2 illustrates a high-level view of the invention for associating annotations with a region of an image or of an image sequence.

FIG. 2 illustrates a high-level view of the invention for associating annotations with a region of an image or of an image sequence. An annotated region 210 is linked to an entity 200. An entity here is for example an image item that describes an image. This entity may also be another kind of item, a group of items, a track or samples within a track or even subsamples within samples of a track. The link between the annotated region and the entity may be, depending on the entity and according to various embodiments an item reference, an item property, a track reference, a sample description or a sub-sample description.

An annotated region 210 may be defined by a geometry 220, for example as an anchor point and a shape. Several kinds of geometry can be defined: a point, a rectangle, a circle, a polygon, a binary mask. . . . Other geometries may also be used, such as a 3D box projected onto the image plane. The geometry may change along time: the anchor point or the shape or both.

An annotated region 210 may also contain or may be linked to one or more annotations 230, 231, and 232. These annotations are used to store information describing or corresponding to the region 210 of the entity 200. An annotation can be for example the focus location of the picture, a face detected in an image, an object detected in the image, a GPS location corresponding to an object in the image, a description for a part of the image, the text contained in a region of the image. . . . It may be user generated or machine generated, preferably as one or more null terminated character strings. A textual annotation is defined as an annotation comprising one or more character strings. It may be human readable. One of the character string may define the language of the text in the other, or others, character string. As for geometry, a given region may have annotations varying along time depending on the media content. For example a textual annotation may be described using the item property for user description 'udes' defined in HEIF.

Figure 3:
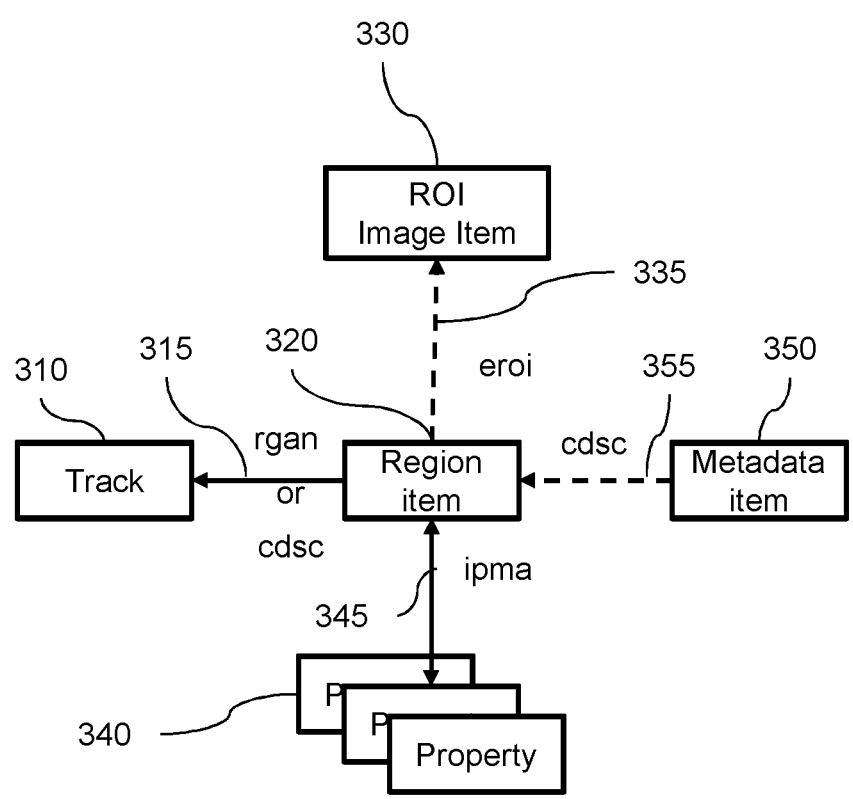
FIG. 3 illustrates a first embodiment where an annotated region is described as an item associated with a track.

FIG. 3 illustrates a first embodiment where an annotated region is described as an item (region item 320) associated with a track. The encapsulation module while encapsulating a picture track or a video track 310 when receiving or extracting object information may create a 'meta' box in the file to declare a region item 320 in an ItemInfoEntry box. The track 310 may be a picture track (e.g. identified by a 'pict' handler type, like HEIF image sequence track) or a video track (e.g. identified by a 'vide' handler type, like an HEVC or VVC track stored in ISOBMFF or an ISOBMFF-based specification like HEIF, MIAF or any application format). The region item 320 has a specific item type and an item_ID not conflicting with other item or track or any other entity in the media file's ID. The region item 320 is associated with the track using an item reference box. The item reference type may be the generic 'cdsc' item reference type indicating that the region item provides some description of the track 310. Alternatively, the item reference type may be of a more specific type, for example 'rgan' to indicate that the region item provides annotated region information. Using a more specific item reference type, provides more precise indication of the relationship between the track and the region item. This is an indication to parsers or media players on how to process an item. The region item may be associated with one or more item properties 340 as can be any HEIF item (e.g. using the 'ipma' box 345). For example, an item property may provide the anchor point. Another property may provide the geometry of the region. A single item property may provide both location and shape. Alternatively, the anchor point or geometry are in the data part of the region item, in the data part of the file (e.g. 'mdat' or 'idat' box) and indexed by an ItemLocationBox. Another item property, representing a textual annotation, may be a 'udes' item property providing title or description or tags for the region. Optionally, metadata items 350 may provide further description of the region item 320. For example, XMP metadata or MPEG-7 descriptors or vendor-specific metadata (e.g. in a 'uuid' box) may provide more detailed information on the region. This detailed information may not be human readable. The format for these additional metadata may depend on the format generated by the object recognition module 110. This is indicated by the dashed arrow 355. As well, when video or image content is available for the region item 320, this item may contain an item reference 335 to this video or image item, called ROI image item 330, providing a representation of the region. For this, an item reference of type 'eroi' (for "encoded region of interest") may be used. It is to be noted that 330 may be a single image item, for example a picture of a detected person onto the video track. It may also be a set of alternative image items (different pictures of this detected person, grouping into an 'altr' entity to group). It may also be an image sequence track or video track, showing the person's face along the sequence in track 310. The ROI image item 330 and the track 310 may have some relationship (not represented) indicated in the media file.

For this embodiment, the item reference 315 and the optional item reference 335 require the "to_item_ID" field of the ItemReferenceBox to reference, in addition to items, track or group of tracks (for example a set of alternative tracks). The semantics of the to_item_ID becomes: to_item_ID contains the item_ID or the group_id of an entity to group or the track_ID or the track group_id of respectively the item, entity group, track or track group referred to. This is relevant in media file mixing items and tracks and using unique IDs (as may be indicated by the 'unif' brand in the ftyp box of the file). This may be a simple way to associate item properties to a track. Extending semantics of ItemReferenceBox allow any item in the 'meta' box of a media file to be associated to a track in the 'moov' part of a media file.

In a variant, offering even more direct association of an item property to a track, the 'ipma' box may be extended to allow referencing, in addition to item ID or entity ID also track IDs. This may be useful for media files containing picture or video track and image items: some properties associated to image items may be associated with this mechanism to all samples of a video or picture track. The so-extended 'ipma' box may be indicated by a new version of the box or a flags value or when using a specific brand, for example the 'unif' brand. While describing annotated region as an item allows simple annotated region of an image sequence or video track, it is limited to "static annotated region". A static annotated region is an annotated region that does not change (e.g. that is invariant) along the whole track 310. The next embodiments allow dynamic annotated region.

Figure 4:
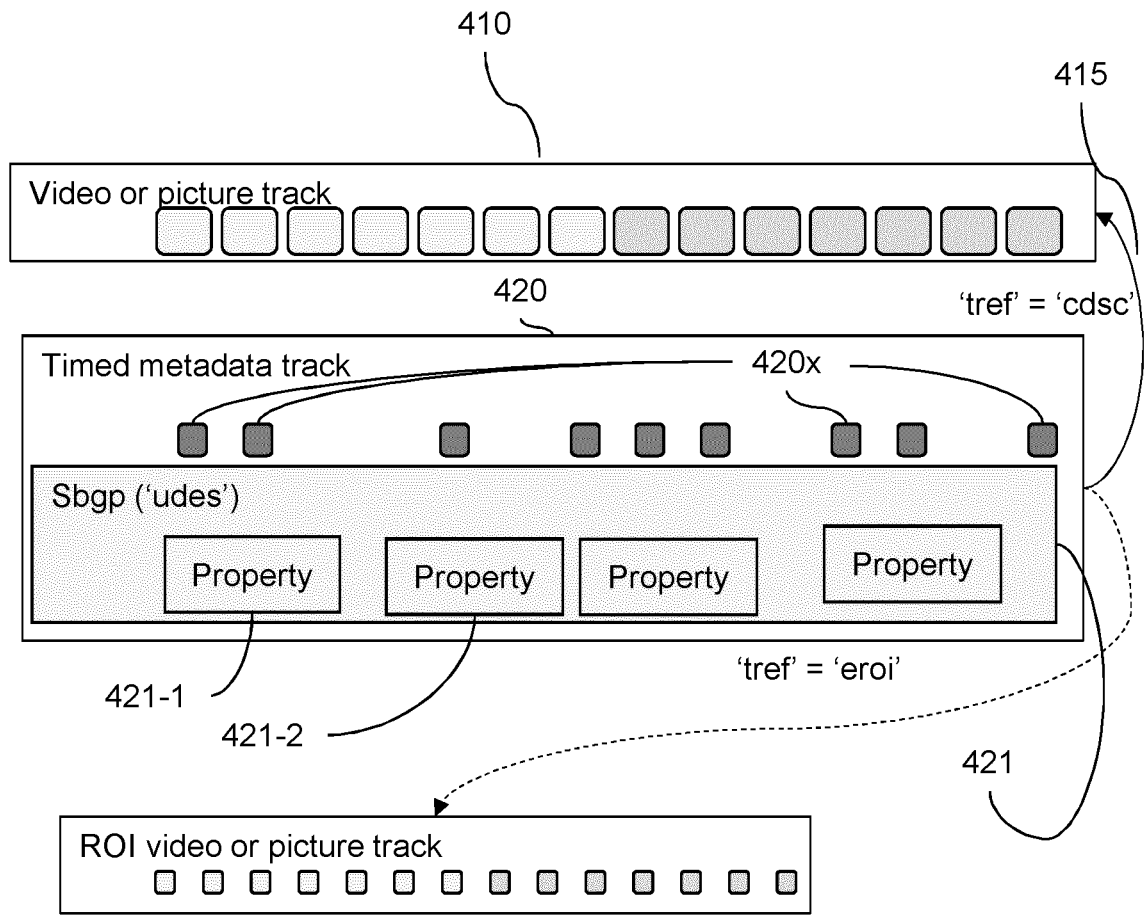
FIG. 4 illustrates a first variant of a second embodiment where an annotated region is described within a metadata track describing regions positions or size.

FIG. 4 illustrates a first variant of a second embodiment where region annotations are stored in a different track than the media track (describing the video or sequence of images). In this embodiment, a first video or image sequence track 410 containing samples is described. A second track 420, a timed metadata track 420 is dedicated to the storage of annotated regions for this video track as sample 420x. The timed metadata track is associated with the video track with a track reference type set to 'cdsc' (415, for content description). As an example of timed metadata track, the '2dcc' track from MPEG-B Part-10 may be used. A sample of a '2dcc' track provides the anchor point and the sizes of a rectangular region of interest in the corresponding sample (e.g. with same decoding time) of the first track 410. Optionally, the timed metadata track may also be associated with another video or image sequence track providing representation of the region of interest described in this timed metadata track. This may be indicated by the 'eroi' track reference type, as defined in MPEG-B Part-10. To distinguish a timed metadata track as defined in MPEG-B Part-10 from a timed metadata track according to this embodiment, a specific track reference may be used between the timed metadata track with annotations 420 and the media track 410. For example, instead of the generic 'cdsc' one, a track reference type set to 'rgan' for "region annotation" can be set between a timed metadata track 420 and the video track from which the region has been identified or extracted.

It is to be noted that the timed metadata track 420 may not contain as many samples as the video track 410 it describes. For example, when the region of interest's position and size remain stable along time (as depicted on some time interval on FIG. 1d) or when the position or size may be interpolated, there may be no sample 420x corresponding to a video sample. In this embodiment, the timed metadata track 420 is extended with a new sample group providing annotations (421-1, 421-2 . . . ) for the regions described in the samples 420x. In a first variant, a new grouping_type 'udes' 421 is proposed to associate group of samples with either a title, a description or a tag. A specific UserDescriptionSampleGroupEntry is defined as inheriting from SampleGroupDescriptionEntry (for example from TextSampleGroupEntry) to allow the indication of the following parameters:
  abstract class UserDescriptionSampleGroupEntry ( )
    extends TextSampleGroupEntry ('udes')

```
{
    utf8string lang;
    utf8string name;
    utf8string description;
    utf8string tags;
}
``` with the following semantics:

lang is a character string containing an RFC 5646 compliant language tag string, such as "en-US", "fr-FR", or "zh-CN", representing the language of the text contained in name, description and tags. When lang is empty, the language is unknown/undefined.

name is a null-terminated UTF-8 character string containing human readable name for the item or group of entities. If not present (an empty string is supplied) no name is provided.

description is a null-terminated UTF-8 character string containing human readable description of the item or group of entities. If not present (an empty string is supplied) no description is provided.

tags is a null-terminated UTF-8 character string containing comma-separated user-defined tags related to the item(s). If not present (an empty string is supplied) no tags is provided.

It is to be noted that in this variant, since the user description sample group entry provides the same parameter as the 'udes' item property from HEIF, the same 4 cc is used for the grouping type. This allows players to reuse the same parsing code for sample group or item property with this type. In an alternative, a different 4 cc may be used, especially if only a single text parameter is preferred to describe an annotated region ('rdes'), for example as follows:

abstract class RegionDescriptionSampleGroupEntry ( )
    extends TextSampleGroupEntry ('rdes')

```
{
    utf8string lang;
    utf8string description;
}
``` with the same semantics as in previous variant.

For these variants, the new sample group entry for region annotation ('rdes' or 'udes' or any other dedicated 4 cc) permits the association of group of samples with a user-defined name (e.g. title, name, description, or tags); there may be multiple such properties, which shall have different language codes (different values for their lang parameter). When several instances of the new sample group entry for region annotation ('rdes' or 'udes' or any other dedicated 4 cc) are associated with the same group of samples, they represent alternatives possibly expressed in different languages and a reader should choose the most appropriate. These alternatives may be distinguished by the grouping_type_parameter, for example set to a value 'lang' or 'reusing the 'mela' four character code for "Media language", as for the differentiating attribute in the track selection box. At most one the new sample group entry for region annotation ('rdes' or 'udes' or any other dedicated 4 cc) with the same lang value should apply to the same group of samples.

This embodiment may apply even for static region by defining the 'udes' or 'rdes' sample group as being static.

In a variant for this embodiment where the region annotations are stored in the track providing the location and size of the regions, the annotations (420-1, 420-2 . . . ), instead of being declared as a sample grouping may be stored in a new definition of the samples 420x. For example, a new sample entry type '2dca' may be defined as follows:

The 2D Cartesian coordinates with annotation '2dca' sample entry provides spatial information related to the referenced track expressed in a two-dimension Cartesian coordinate system, optionally with a textual description (human-readable) of the region. Such sample indicates region geometry and optionally annotations, for example as an additional string parameter that may be an empty string. The length of the string is determined by the sample size indicated in the appropriate ISOBMFF box: The 2D Cartesian coordinates sample may be defined as follows:

```
aligned(8) class 2DCartesianCoordinatesSample {
    unsigned int(16) top_left_x;
    unsigned int(16) top_left_y;
    unsigned int(16) width;
    unsigned int(16) height;
    unsigned int(1) interpolate;
    unsigned int(7) reserved;
    utf8string    annotation;
}
``` top_left_x and top_left_y give respectively the horizontal and vertical coordinate of the top-left corner of the rectangle region associated with the media sample of the referenced track.width and height give respectively the width and height of the rectangular region associated with the media sample of the referenced track.interpolate indicates the continuity in time of the successive samples. When true, the application may linearly interpolate values of the ROI coordinates between the previous sample and the current sample. When false, there shall not be any interpolation of values between the previous and the current samples and where annotation is a null-terminated UTF-8 character string containing human readable description of the ROI. If not present (an empty string is supplied) no description is provided. When the interpolate flag is set, it is expected that the interpolated samples match the presentation time of the samples in the referenced track. For instance, for each video sample of a video track, one interpolated 2D Cartesian coordinate sample is calculated. For the annotation, the same annotation repeats in interpolated samples.

Figure 5:
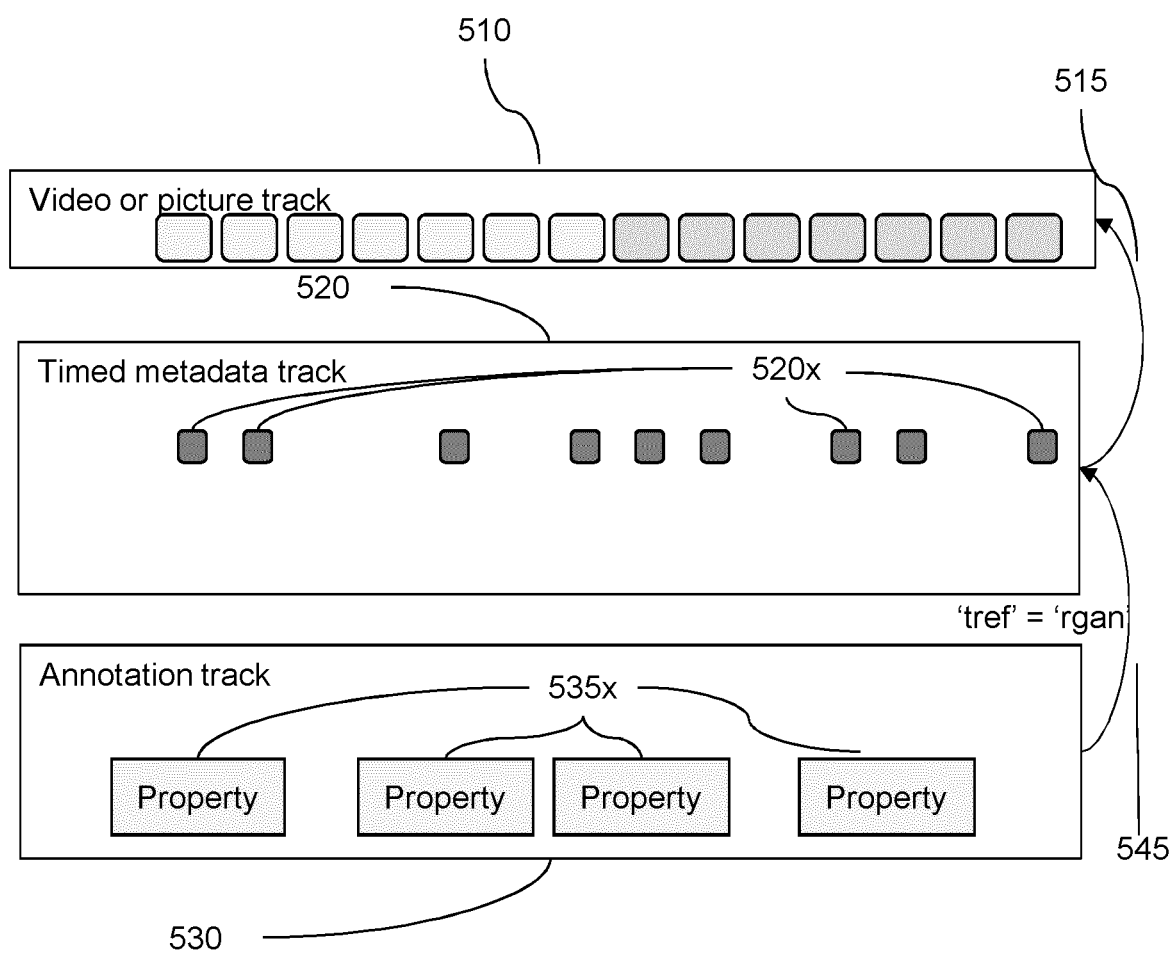
FIG. 5 illustrates a second embodiment of the invention where an annotated region is described in its own track.

FIG. 5 illustrates a second embodiment of the invention. In this embodiment, region annotations are in a different (metadata) track distinct than the media track. A first video or image sequence track 510 contain samples. These samples may be NAL unit based samples. A second track 520, a timed metadata track is dedicated to the storage of regions positions and sizes for this video track 510 as samples 520x. The timed metadata track is associated with the video track with a track reference type set to 'cdsc' (515, for content description). This second track 520 may be associated with an 'eroi' track reference type to another media track (not represented) providing encoded version of the region of interest. A third track 530 is created by the encapsulation module to provide the region annotations as samples 535x. This track 530 is associated with the second track 520 providing region position and sizes with a new track reference type dedicated to the indication of region annotations 'rgan' 545. When parsing the track reference 345, a parser or media player is informed that the third track 530 provides annotation for the regions defined in the second track 520.

The new track reference type respectively allows encapsulation module and parsers to describe and identify this track as one track dedicated to the storage of annotations for regions.

The handler type for such third track 530 may be set to 'text' to indicate that samples contain textual annotations and that the associated decoder will process only text data. The textual annotations may be user-generated or machine generated. It describes a region identified in or extracted from a video or image sequence track. The textual annotation in the sample of such track may be accompanied with a parameter indicated the language for this textual description. As an alternative, the language is indicated in the media header box (language field). The former is preferred when textual description in alternative languages are provided for a region. Samples for textual description may or may not be aligned with samples of the second track or of the first (media) track. When not aligned, the textual description applies until a new sample providing a new textual description is defined in the third track. The sample duration are set accordingly to indicate these durations. For fragmented files, it is recommended to provide a textual description sample for the first sample of the fragment. The payload of the sample is a null terminated string (when language is not present) or consist in two null-terminated strings (when language is provided within the sample). The sample size in the appropriate ISOBMFF box (e.g. 'stsz' or 'stz2') provides the lengths of these strings.

According to this embodiment, a media file may contain (or reference through the data reference box 'dref') multiple "third tracks" providing annotations for the regions described in the second track. Each of these third track has a track reference of type 'rgan' indicating that each provides annotations for the regions described in the referred second track. The set of third tracks may be declared as a group of alternate tracks. In this case, only one should selected and used to render the region annotation on a media player interface. This could be the case, for example, when third tracks provide alternate language for the region annotations. This may be further indicated in a track selection box with a differentiating attribute set to Media language 'mela'. There may be cases where the set of third tracks that provides annotations for the regions described in the second track are rather complementary than alternate. For example, there may be a first third track providing user annotations like a title, a second third track providing machine generated tags, a third track providing even more detailed information like for example a WebVTT track (providing annotation but also rendering instructions) or an MPEG-7 track. Some of the third tracks (e.g. containing structured data) may then have a handler-type set to 'meta' rather than 'text'. In this case, the parser or media player may select and render on a client interface the different annotations. The client may provide in a GUI means for the user to adapt or select the level of annotation he or she would like to see. In a variant, the specific track reference type between the track defining the region position and size and the track providing the annotations may be from track 520 to track 530. This is relevant for parsers because if they decide not to process the track describing the region position and size they may not be interested in the annotation track either. At the reverse, when processing the track 520, following the specific track reference 545, it will get the track or group of tracks providing the annotations. Having the track reference 545 in this direction is of interest when there are multiple alternative or complementary "third" tracks, the track reference directly referencing the alternate group of tracks in the track_IDs parameter.

Figure 6:
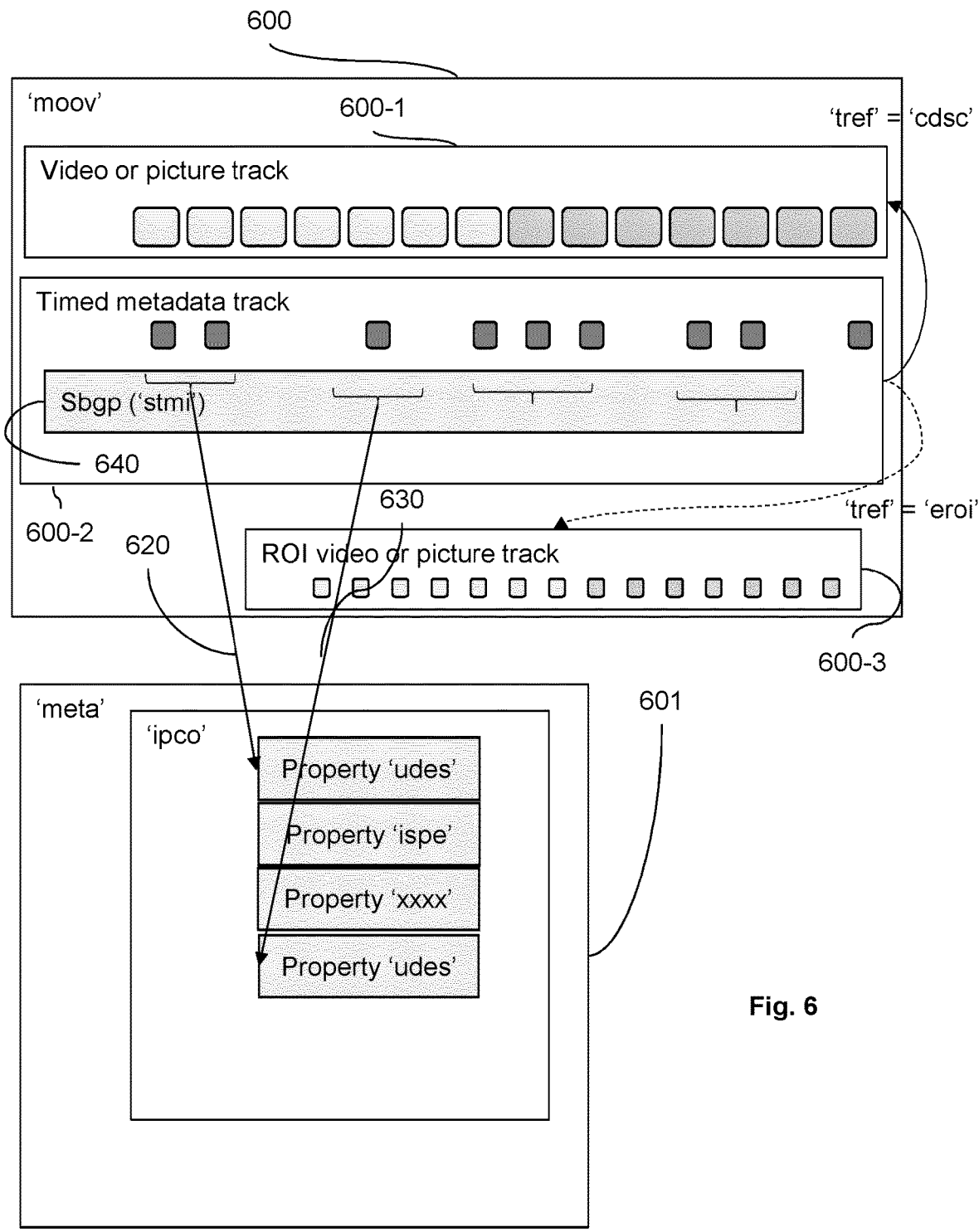
FIG. 6 illustrates a third embodiment where annotated regions are stored in the 'meta' part of a media file.

FIG. 6 illustrates a third embodiment where annotated regions are stored in the 'meta' part of a media file 601 while track description is within the 'moov' part of the media file 600. In this embodiment, the media file is augmented with regions annotations that are stored within the file-level 'meta' box 601.

In this embodiment, the position and sizes of the regions are stored in a timed metadata track 600-2. Optionally, a video or picture track 600-3 provides encoded representation of some regions.

In a first variant, region annotations are declared as item properties of type 'udes' (for example in the 'ipco' box), and the track 600-2 providing the region position and size (e.g. the geometry of the region), contains a sample grouping 640 providing SampleToMetadataItemEntry (from ISOBMFF specification). In other words, group of 2dcc samples from the track 600-2 may be associated with one or more item property of type 'udes', as illustrated by the arrows 620 or 630. The item_ID in the SampleToMetadataItemEntry is set to the implicit ID of the property in the 'ipco' container box. Indeed, 'ipco' box implicitly defines an identifier that corresponds to the position of an item property in the 'ipco' box. Several groups of samples may be linked to a same item property providing annotated region. Some item property providing annotations or user descriptions may not be referenced by samples from the timed metadata track 600-2 (for example, because they are used for other image items also declared in the media file). The sample grouping 640 may be a default grouping when all the samples describing the position and size of a region have the same annotation.

In a second variant, to explicitly indicate that the IDs used in the sample group entries 640 correspond to identifiers of item property, a new grouping type is defined to indicate that samples are actually associated not to items but explicitly to item properties. The syntax of this new grouping type may be as follows (the 4 cc and the name of the sample group entry is here as an example):

```
class SampleToPropertyItemEntry( )
extends SampleGroupDescriptionEntry('stpi') {
    unsigned int(32) property_type;
    unsigned int(32) num_items;
    for(i = 0; i < num_items; i++) {
        unsigned int(32) property_index[i];
    }
}
```

The property_type is an optional parameter indicating the 4 cc corresponding to the type of property to which samples are associated. When present, the property_index may count only properties of the specified type. When not present (or by default), the property_index is the 1-based index (counting all boxes, including FreeSpace boxes) of the associated property box in the ItemPropertyContainerBox contained in the same ItemPropertiesBox. The value 0 may be reserved, because it would indicate no association to any property. This can be signalled by not mapping samples or NAL units to a property.

According to a fourth embodiment, the video or picture track itself contains or references the annotated regions.

Figure 7:
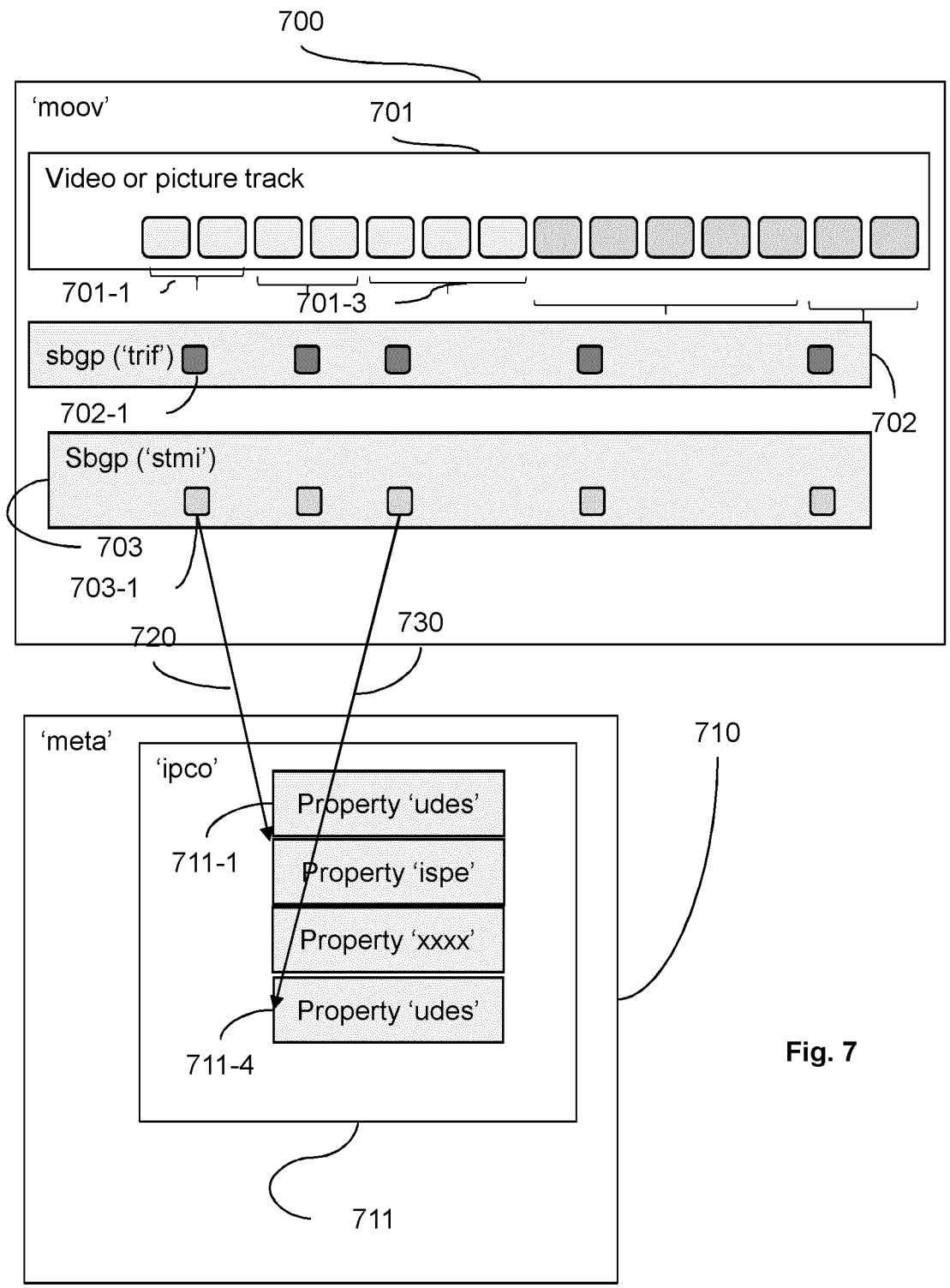
FIG. 7 illustrates a fourth embodiment where annotated regions are stored within a media track.

In a first variant, depicted on FIG. 7, the media file has a 'moov' part describing a video or picture track 701 and a 'meta' part 710 providing region annotation description, for example as item properties (711-1 or 711-4) declared in the 'ipco' box 711. The media track 701 contains NALU-based samples, each representing an image (or a partition of an image, for example a slice, a tile or a subpicture). This track may be fragmented along time. The video track 701 contains two sample groups 702 and 703 in the sample table box. The first sample group 702 provides the position and size of regions of interests identified or extracted by the object recognition module 110. For example, the sample group description entry 702-1 provides a description of a region identified within the group of samples 701-1. For this purpose, the encapsulation module may use the existing 'trif' sample group or any sample group providing location and shape of an image region. The second sample group 703 provides annotations for the regions described by the first sample group 702. As an example, the sample group description entry 703-1 provides a reference (720) to an annotation for the group of samples 701-1. The grouping type may be the 'stmi' or 'stpi' sample grouping as described in the previous embodiment. onto the video or picture samples. The second sample group associates samples or group of samples of the video or picture track to one or more item properties in the 'meta' box. As an example, the second sample, group 703 associates the first group of samples 701-1 to the item property of type 'udes' 711-1 and the second sample group 703 also associates the group of samples 701-3 to the item property 711-4. It is to be noted that for region annotation, groups of samples are mapped to 'udes' item properties, but the same would apply when mapping samples of a media track to any kind of item property. NAL units (with the NALU mapping mechanism), samples or group of samples of a media track may be mapped to item properties through a 'stmi' or 'stpi' sample group like 703. In such case, the first sample group 702 becomes optional, because dedicated to regions. Moreover, with default sample grouping, this could be an easy way to associate item properties to all the samples of a track. This could be an alternative to the embodiment of FIG. 3 or to the extensions of the ItemReferenceBox to also reference tracks. The two group of samples between 702 and 703 may be aligned or may be not aligned. When aligned, this means that each region described in the first sample group is associated to an annotation property. When not aligned, this means that one annotation property may apply to different regions described in the first sample group or that one region in the first sample group may have several annotations. Both sample groups may use the properties of sample group like default, static or virtual sample grouping when the grouping_type allows it. The first and second sample groups may also be used for samples but also for NAL units through the NALU mapping mechanism.

In a variant, the video track contains a sample group to associate groups of samples to region item (like 320). This means that both geometry and annotation of detected or extracted regions from the media track 701 are described in the meta part of the media file 710. This would avoid the declaration of the first sample group 702 providing the position and size of these detected or extracted regions of interest.

Figure 8:
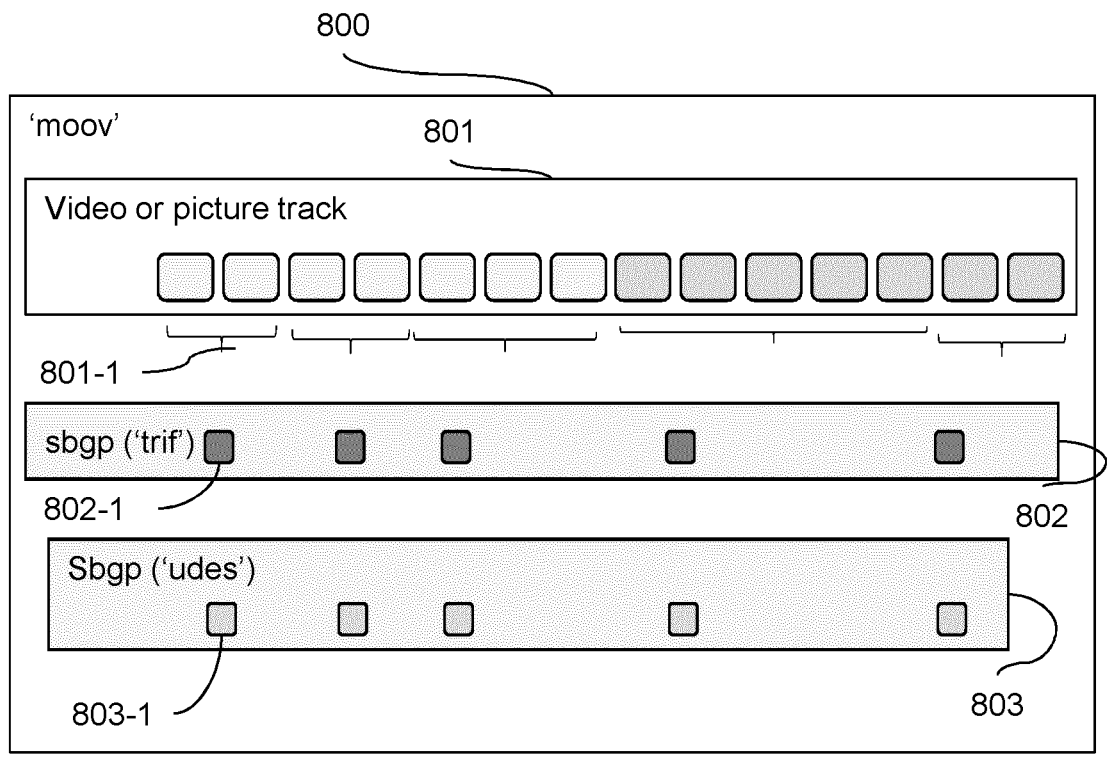
FIG. 8 illustrates a variant of the fourth embodiment where the media file has only a 'moov' part.

In another variant, depicted on FIG. 8, the media file 800 has only a 'moov' part. The media track is self-contained or self-described, meaning that it is not related to item properties or to additional tracks. In this variant, the media track 800 has a sample group mechanism to describe the region annotations. FIG. 8 depicts an example of two distinct sample groups 802 and 803 but there could be a single one merging the properties from the two sample group description entries of 802 and 803. Such merging may be interesting when the group of samples in 802 and 803 are aligned, thus saving description bytes for one SampleToGroupBox and one SampleToGroupDescriptionBox. This is the case where a same group of samples has the same region annotation and a same region description (e.g. location, size . . . ) for the duration of this group of samples. Back to FIG. 8, the media track 801 contains a combination of a first sample group of a grouping type providing a position and size of a region (e.g. 'trif' sample group 802) and a second sample group 803 of a grouping_type providing textual description for group of samples (like the 'udes' or 'rdes' from previous embodiment). As an example, the group of samples 801-1 may be associated to a first sample group description entry 802-1 and to a second sample group description entry 803-1. While the figure illustrates same group of samples mapped to two different sample group description entries, the group of samples mapped to 802-1 and 803-1 may be different. This keeps the annotated region simple because all information is stored in a single track, especially for media streaming use cases, thus avoiding transmission delays and synchronization issues in the reception of the data for the different tracks. A limitation is that the roi or region position may not move on a sample basis, but only on a fragment basis, when a new sgpd of type trif (or type for the position and size of a region) may be defined. This embodiment also allows annotations on a subsample basis (e.g. range of NAL units, slice, tile or subpicture) when a first sample to group box first maps samples to NAL unit patterns, through a NALU MapEntry, and this NALU Map entry maps NAL units to a sample group description box containing a new sample group entry (e.g. the 'rdes' or 'udes' from previous embodiment or any other dedicated 4 cc). In variants where annotations relate to full image, the first sample group 802 describing the regions becomes optional, only the second sample group 803 may be present in the file. As well, when used with a NALU mapping mechanism, and when annotations correspond to partitions in the sample or image (e.g. slices, tiles or subpictures) and that these partitions correspond to one or more NAL units, the first sample group may be optional. If the media track 801 contains samples corresponding to partition of an image (e.g. HEVC tile track or VVC subpicture track), annotation may be associated to sample or groups of samples of such track via the second sample group 803, making the first sample group 802 optional.

Figure 9:
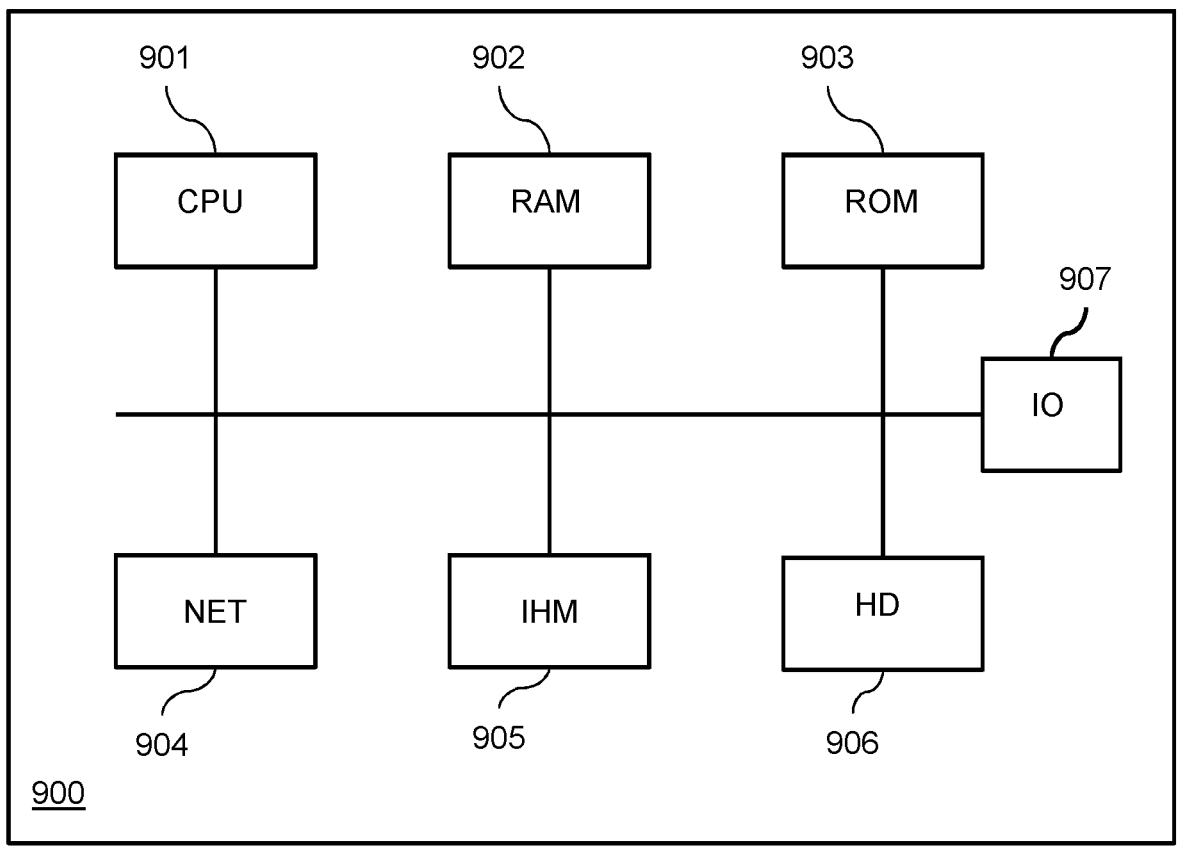
FIG. 9 is a schematic block diagram of a computing device for implementation of one or more embodiments of the invention.

FIG. 9 is a schematic block diagram of a computing device 900 for implementation of one or more embodiments of the invention. The computing device 900 may be a device such as a micro-computer, a workstation or a light portable device. The computing device 900 comprises a communication bus connected to:
- a central processing unit 901, such as a microprocessor, denoted CPU;
- a random access memory 902, denoted RAM, for storing the executable code of the method of embodiments of the invention as well as the registers adapted to record variables and parameters necessary for implementing the method according to embodiments of the invention, the memory capacity thereof can be expanded by an optional RAM connected to an expansion port for example;
- a read only memory 903, denoted ROM, for storing computer programs for implementing embodiments of the invention;
- a network interface 904 is typically connected to a communication network over which digital data to be processed are transmitted or received. The network interface 904 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 901;

a user interface 905 may be used for receiving inputs from a user or to display information to a user;

a hard disk 906 denoted HD may be provided as a mass storage device;

an I/O module 907 may be used for receiving/sending data from/to external devices such as a video source or display.

The executable code may be stored either in read only memory 903, on the hard disk 906 or on a removable digital medium such as for example a disk. According to a variant, the executable code of the programs can be received by means of a communication network, via the network interface 904, in order to be stored in one of the storage means of the communication device 900, such as the hard disk 906, before being executed.

The central processing unit 901 is adapted to control and direct the execution of the instructions or portions of software code of the program or programs according to embodiments of the invention, which instructions are stored in one of the aforementioned storage means. After powering on, the CPU 901 is capable of executing instructions from main RAM memory 902 relating to a software application after those instructions have been loaded from the program ROM 903 or the hard-disc (HD) 906 for example. Such a software application, when executed by the CPU 701, causes the steps of the flowcharts of the invention to be performed.

Any step of the algorithms of the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of generating a media file, the method comprising:
   generating a first track of media data samples;
   generating a second track of timed metadata, the second track being associated with the first track using a track reference and comprising at least one region geometry stored in a sample,
   wherein the at least one region geometry describes a geometry of a region in a media data sample of the first track,
   wherein the at least one region geometry is associated with at least one region annotation describing the region in the media data sample of the first track; and
   generating a media file including the first track, the second track and associated region annotation.

2. The method of claim 1, wherein:
   the region geometry comprises the location of an anchor point and the shape of the region.

3. The method of claim 1, wherein:
   the region annotations are stored as properties of a group of samples of the second track.

4. The method of claim 1, wherein the method further comprises:
   generating a third track of samples, each sample being a region annotation associated with a region geometry of the second track, the third track being associated with the second track using a track reference.

5. The method of claim 1, wherein:
   region annotations are stored as properties in a property container in a meta data part of the media file.

6. The method of claim 5, wherein:
   the at least one region geometry is associated with the region annotations through group of samples in the second track.

7. The method of claim 5, wherein:
   the association between region annotations and the at least one region geometry is stored in a sample group description entry indicating the index of the region annotation in the property container, the sample group description entry being associated with a group of samples in the second track.

8. The method according to claim 1, wherein region annotations comprise textual annotations.

9. The method according to claim 1, wherein region annotations comprise alternative representations of the region.

10. A non-transitory computer-readable storage medium storing instructions of a computer program for implementing a method according to claim 1.

11. A device for generating a media file, the device comprising a processor configured for:
    generating a first track of media data samples;
    generating a second track of timed metadata, the second track being associated with the first track using a track reference and comprising at least one region geometry stored in a sample,
    wherein the at least one region geometry describes a geometry of a region in a media data sample of the first track,
    wherein the at least one region geometry is associated with at least one region annotation describing the region in the media data sample of the first track; and
    generating a media file including the first track, the second track and associated region annotation.

12. A method of processing a media file, the method comprising:
  obtaining a media file including:
    a first track of media data samples; and
      a second track of timed metadata, the second track being associated with the first track using a track reference and comprising at least one region geometry stored in a sample,
    wherein the at least one region geometry describes a geometry of a region in a media data sample of the first track,
    wherein the at least one region geometry is associated with at least one region annotation describing the region in the media data sample of the first track;
  obtaining media data samples from the media file;
  obtaining a region geometry associated with media data samples, associated geometry and associated region annotations;
  processing the obtained media data and information for outputting a video based on the obtained media data and information.

13. A device for processing a media file, the device comprising a processor configured for:
  obtaining a media file including:
    a first track of media data samples; and
    a second track of timed metadata, the second track being associated with the first track using a track reference and comprising at least one region geometry stored in a sample,
      wherein the at least one region geometry describes a geometry of a region in a media data sample of the first track,
      wherein the at least one region geometry is associated with at least one region annotation describing the region in the media data sample of the first track;
  obtaining media data samples from the media file;
  obtaining a region geometry associated with media data samples, associated geometry and associated region annotations;
  processing the obtained media data and information for outputting a video based on the obtained media data and information.

* * * * *